US012585612B2

(12) United States Patent
Yudanov et al.

(10) Patent No.: US 12,585,612 B2
(45) Date of Patent: Mar. 24, 2026

(54) MEMORY DEVICE WITH EMBEDDED DEEP LEARNING ACCELERATOR IN MULTI-CLIENT ENVIRONMENT

(71) Applicant: Micron Technology, Inc., Boise, ID (US)

(72) Inventors: Dmitri Yudanov, Rancho Cordova, CA (US); Troy Allen Manning, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 160 days.

(21) Appl. No.: 17/899,531

(22) Filed: Aug. 30, 2022

(65) Prior Publication Data

US 2024/0070107 A1    Feb. 29, 2024

(51) Int. Cl.
G06F 13/42        (2006.01)
G06F 13/32        (2006.01)

(52) U.S. Cl.
CPC .......... G06F 13/4234 (2013.01); G06F 13/32 (2013.01)

(58) Field of Classification Search
None
See application file for complete search history.

(56) References Cited

U.S. PATENT DOCUMENTS

| 7,539,153 B1* | 5/2009 | Liang | H04L 45/00 370/255 |
| 10,324,915 B2* | 6/2019 | Saeki | G06F 16/221 |
| 10,664,438 B2* | 5/2020 | Sity | G11C 7/1072 |
| 11,442,866 B2* | 9/2022 | Ke | G06F 12/0875 |
| 11,444,845 B1* | 9/2022 | Leen | H04L 67/1004 |
| 2014/0298303 A1* | 10/2014 | Kanada | G06F 8/41 717/140 |
| 2021/0125102 A1* | 4/2021 | Ohtsuji | G06N 3/084 |
| 2021/0191871 A1* | 6/2021 | Ke | G06F 12/0875 |
| 2021/0232969 A1* | 7/2021 | Hu | G06F 3/1438 |
| 2022/0164297 A1* | 5/2022 | Sity | G06F 12/0802 |
| 2023/0195439 A1* | 6/2023 | Egger | G06F 8/452 717/150 |

* cited by examiner

*Primary Examiner* — Michael Sun
(74) *Attorney, Agent, or Firm* — Greenberg Traurig

(57)        ABSTRACT

Systems, methods, and apparatus related to memory devices. In one approach, a memory device includes memories that store data received from a host device. The memory device includes a memory interface to the host device. The memory device further includes one or more processing devices to perform, using a portion of the data stored in one or more of the memories, computations for a neural network. An output of the neural network is stored in one of the memories. The memory device has a controller that controls memory access by the host device and the processing devices to avoid a conflict. The memory device communicates with the host device over the memory interface using a DRAM bus protocol. This communication includes sending the output of the neural network to the host device.

33 Claims, 7 Drawing Sheets

Manage time slots for read and write
access to memory
701

Receive data from a host using
a memory bus protocol
703

Store the received data during a first time slot
705

Perform computations for a neural
network using the stored data
707

Store output from the neural network during
a second time slot
709

Send the output to the host using the
memory bus protocol
711

MEMORY DEVICE WITH EMBEDDED DEEP LEARNING ACCELERATOR IN MULTI-CLIENT ENVIRONMENT

FIELD OF THE TECHNOLOGY

At least some embodiments disclosed herein relate to memory devices in general, and more particularly, but not limited to a memory device having memory and an embedded artificial intelligence accelerator.

BACKGROUND

Memory devices are typically provided as internal, semiconductor, integrated circuits in computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others.

Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource can include a number of functional units such as arithmetic logic unit (ALU) circuitry, floating point unit (FPU) circuitry, and a combinatorial logic block, for example, which can be used to execute instructions by performing logical operations such as AND, OR, NOT, NAND, NOR, and XOR, and invert (e.g., inversion) logical operations on data (e.g., one or more operands). For example, functional unit circuitry may be used to perform arithmetic operations such as addition, subtraction, multiplication, and division on operands via a number of logical operations.

A number of components in a computing system may be involved in providing instructions to the functional unit circuitry for execution. The instructions may be executed, for instance, by a processing resource such as a controller and/or host processor. Data (e.g., the operands on which the instructions will be executed) may be stored in a memory array that is accessible by the functional unit circuitry. The instructions and data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the instructions and data may also be sequenced and/or buffered.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
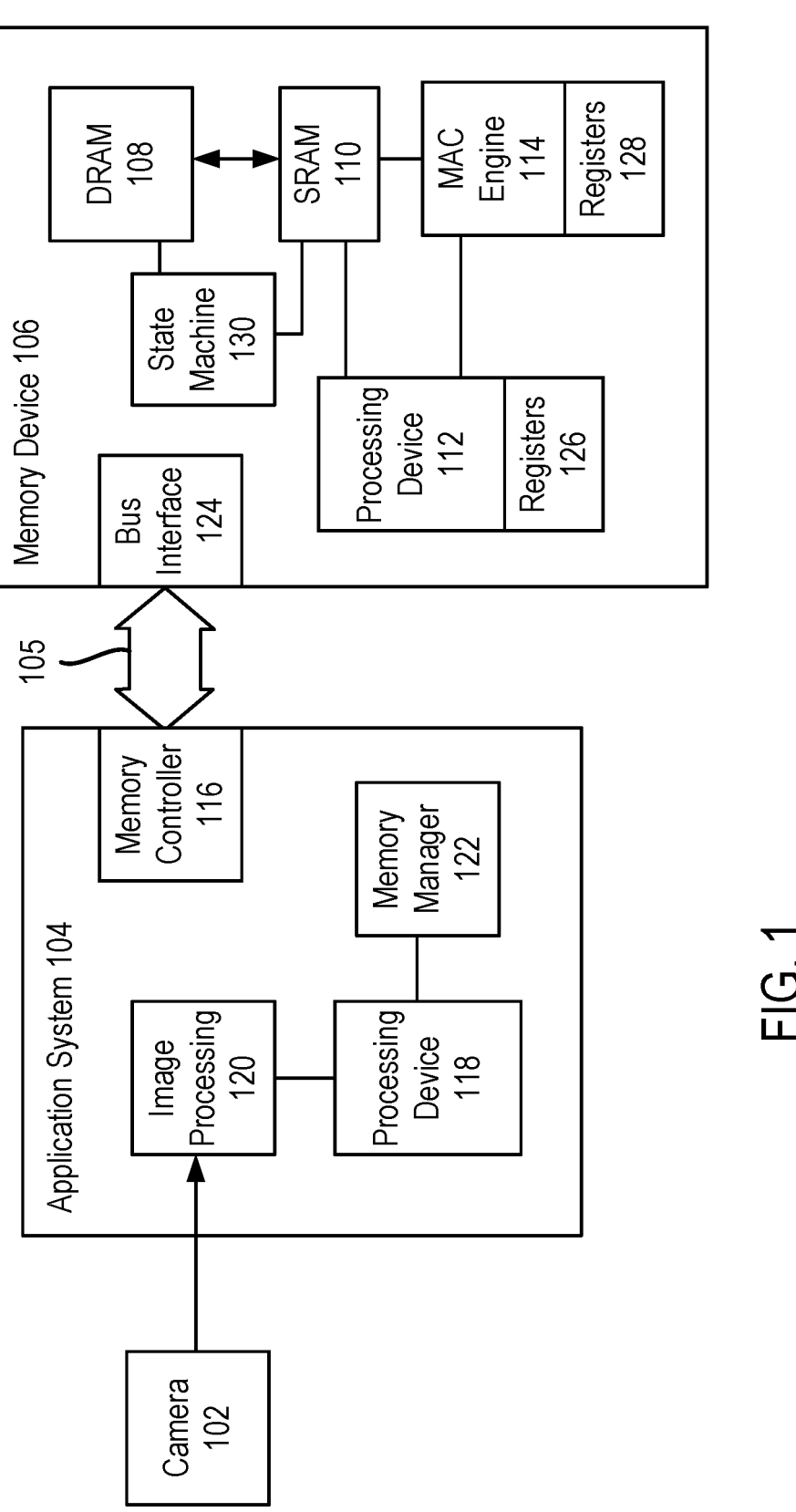
FIG. 1 shows a memory device that uses images from a camera as input to a neural network running on the memory device, in accordance with some embodiments.

The following disclosure describes various embodiments for memory devices having memory and processing resources on the same chip. The memory device may, for example, store data used by a host device (e.g., a computing device of an autonomous vehicle, or another computing device that accesses data stored in the memory device). In one example, the memory device is a solid-state drive mounted in an electric vehicle.

Artificial intelligence (AI) accelerated applications are growing rapidly in scientific research and commercial areas. Deep learning technologies have been playing a critical role in this emergence and achieved success in a variety of applications such as image classification, object detection, speech recognition, natural language processing, recommender systems, automatic generation, and robotics etc. Many domain-specific deep learning accelerators (DLA) (e.g., GPU, TPU and embedded NPU), have been introduced to provide the required efficient implementations of deep neural networks (DNN) from cloud to edge. However, the limited memory bandwidth is still a critical challenge due to frequent data movement back and forth between compute units and memory in deep learning, especially for energy constrained systems and applications (e.g., edge AIs).

Conventional Von-Neumann computer architecture has developed with processor chips specialized for serial processing and DRAMs optimized for high density memory. The interface between these two devices is a major bottleneck that introduces latency and bandwidth limitations and adds a considerable overhead in power consumption. With the growing demand of higher accuracy and higher speed for AI applications, larger DNN models are developed and implemented with huge amounts of weights and activations. The resulting bottlenecks of memory bandwidth and power consumption on inter-chip data movement are significant technical problems.

To address these and other technical problems, a processing-in-memory device integrates a memory and processor on the same memory device (e.g., same chip) (e.g., a chip having a RISC-V CPU subsystem integrated with a DRAM process). In one example, the DRAM has an LPDDR5 interface. In one example, the chip contains an embedded DLA sub-system that shows high throughput and high energy efficiency by realizing on-chip data movement.

In one embodiment, the memory device is implemented in an end-to-end application system including a full set of hardware and software IPs, and real-world AI applications (e.g., handwritten digit recognition and image classification). A DNN is run on the memory device. In one example, the running of the DNN is fully self-contained, requiring only input data (e.g., an image from a camera). The memory device provides an output that indicates an image classification.

In one embodiment, an artificial intelligence system uses a memory device to provide inference results. Image data from a camera is provided to the memory device. The memory device stores the image data received from the camera.

The memory device includes dynamic random access memory (DRAM), and static random access memory (SRAM). The memory device also includes a processing device (e.g., a local controller) configured to perform computations for a neural network. The neural network uses the image data as input. An output from the neural network provides an inference result. In one example, the memory device has a same form factor as a conventional DRAM device.

The memory device includes a multiply-accumulate (MAC) engine that supports the computations for the neural network. During the computations for the neural network, the SRAM stores data loaded from the DRAM. The processing device uses the data stored in the SRAM during the computations. In one example, the MAC engine uses data stored in the SRAM as inputs for calculations.

The artificial intelligence system also includes a memory controller to control read and write access to addresses in a memory space that maps to the DRAM, the SRAM, and the processing device and/or the MAC engine. In one embodiment, the memory controller is on the same semiconductor die as the memory device. In one embodiment, the memory controller and memory device are on separate die.

In one embodiment, a system includes dynamic random access memory (DRAM) and a processing device to perform computations for a neural network. The processing device and DRAM are located on a same semiconductor die. The system further includes a memory controller to control read and write access to addresses in a memory space that maps to the DRAM and the processing device.

The system also includes a memory manager to receive, from a host device, a new configuration (e.g., a change in manner of operation) for the processing device. The memory manager translates the new configuration to one or more commands, and one or more corresponding addresses (e.g., an address range) in the memory space. The memory manager sends the command(s) and the address(es) to the memory controller. In response to receiving the command(s), the memory controller causes updates to one or more registers of the processing device to implement the new configuration.

FIG. 1 shows a memory device 106 that uses images from a camera 102 as input to a neural network running on the memory device 106, in accordance with some embodiments. The neural network is executed by processing device 112 of memory device 106. MAC engine 114 supports computations required for executing the neural network.

At least a portion of the data used for executing the neural network is loaded from SRAM 110 into MAC engine 114.

The data has been previously loaded into SRAM 110 from DRAM 108. In one example, DRAM 108 stores parameters for the neural network.

Image data is received by application system 104 from camera 102. The image data is processed by image processing 120. In one example, image processing 120 performs segmentation of images from camera 102. Image processing 120 can be implemented as software and/or hardware of application system 104.

In one embodiment, image processing 120 is implemented using software executed by processing device 118. After processing by image processing 120, at least a portion of the processed image data is sent to memory device 106.

Memory manager 122 provides virtual memory management for a memory space of processing device 118. In one example, memory manager 122 is software executed on processing device 118. The memory space includes memory having addresses that map to memory device 106.

The image data received from camera 102 is stored by processing device 118 using memory manager 122. For example, commands are sent by processing device 118 and/or memory manager 122 to memory controller 116 to cause storage of the image data in memory device (e.g., by memory controller 116 sending a write command to bus interface 124). In one example, the image data is stored in DRAM 108 as it is received by memory device 106 from application system 104. In one example, the image data is stored in SRAM 110 (e.g., in a buffer) as it is received from application system 104.

Application system 104 interfaces with memory device 106 using memory bus 105. Memory controller 116 sends commands, addresses, and data over memory bus 105 to bus interface 124. The addresses are associated with the commands and identify storage locations for the data. In one example, the addresses are logical addresses at which data will be stored by memory device 106. In one embodiment, the logical addresses are provided by memory manager 122. In one example, bus interface 124 implements a double data rate (DDR) memory protocol for receiving commands and data from memory controller 116.

Memory device 106 includes state machine 130, which generates signals to control DRAM 108 and SRAM 110. The signals include read and write strobes for banks of DRAM 108, and read and write strobes for banks of SRAM 110. In one example, state machine 130 is executed on processing device 112.

Processing device 112 includes registers 126. MAC engine 114 includes registers 128. Registers 126 and 128 are used to configure the operation of processing device 112 and MAC engine 114, respectively. Each of registers 126 and 128 has an address in the memory space managed by memory manager 122. Data stored by registers 126, 128 can be updated to change the configuration (e.g., manner of operation) for processing device 112 and/or MAC engine 114.

The memory space managed by memory manager 122 includes addresses corresponding to data storage locations in DRAM 108 and SRAM 110. In one example, memory controller 116 manages data storage in memory device 106 in a same manner as for a conventional DRAM memory device. In other words, memory controller 116 writes data to and reads data from the addresses in the memory space corresponding to registers 126, 128 and SRAM 110 using the same memory interface protocol (e.g., same commands and timing requirements) as is used to store data in DRAM 108.

In one example, memory device 106 is implemented as a processing-in-memory (PIM) chip. The PIM chip can, for example, be manufactured using a DRAM manufacturing process. An AI block that includes SRAM 110 and MAC engine 114 replaces two or more banks of a conventional DRAM design layout for DRAM 108. The AI block further includes a 32-bit CPU subsystem. For example, the CPU subsystem is implemented based on a 32-bit RISC-V architecture. It is capable of independently communicating with the banks of DRAM 108 to load/store data to/from SRAM 110 on a 256-bit wide bus. This on-chip data movement capability significantly improves I/O power consumption.

SRAM 110 includes two 16 kilobyte (kB) arrays. One of the 16 kB blocks can be configured as a stand-alone memory for the processor, or as a cache between the processor and DRAM 108. The other 16 kB block can incorporate basic logic operations at the sense amplifier level. Logic operations between two 1K bit SRAM rows can be performed at processor speeds along with shifting capabilities.

A deep learning accelerator (DLA) subsystem is implemented using a multiply-accumulator (MAC) unit (e.g., MAC engine 114) with a flexible DMA engine (not shown). For example, the MAC engine can be configured to operate in 16-bit, 8-bit and 4-bit modes that satisfy INT16/INT8 and optimized INT4 matrix multiplication in modern deep learning applications.

The CPU subsystem also includes a TLB unit containing Memory Management Unit (MMU) functionality (e.g., memory manager 122) if a virtual memory system is desired, and a state machine (sometimes referred to herein as "ASM") RAS manager for data transfer from/to main memory (e.g., DRAM 108). In one example, the ASM RAS manager is implemented by state machine 130.

The CPU subsystem of the PIM chip can be designed based on a production-quality 32-bit RISC-V core. For example, the CPU subsystem can implement the full RVC32IM ISA and can be extended to enhance performance, reduce the code size, increase the energy efficiency, optimize area, and/or is well suited for embedded control applications. RISC-V ISA embraces a modular approach by using instruction "extensions" to add or remove specific functionality, if desired.

In one example, the CPU subsystem is implemented by processing device 112. The CPU subsystem has a microarchitecture that includes two pipeline stages (Instruction Fetch (IF) stage, and Instruction Decode and Execute (IDE) stage). The IF stage has a prefetch-buffer, a FIFO to store instructions from memory, and can handle compressed instructions. The IDE stage decodes the instructions, reads the operands from the register file, prepares the operands for the Arithmetic Logic Unit (ALU) and the multiplication/division unit, and executes the instructions.

A set of control and status registers (CSRs) are implemented to support core operations. In one example, these registers are implemented as registers 126.

In one example, the ALU contains one 32-bit adder with a branch engine, one 32-bit shifter and the logic unit. The multiply/divide unit can multiply two 16-bit operands and accumulate the result in a 32-bit register. The divisions are implemented with an unsigned serial division algorithm collaborating ALU in all the steps.

In one embodiment, a cache controller is added to the CPU subsystem. When enabled, the CPU subsystem functions as a unified instruction/data cache. The cache is organized, for example, as write-back, four-way set associative with a Load-Store Unit (LRU) cache line replacement policy. This implementation can be configured as a 16

KB cache with 128-byte cache lines. Cache misses are handled automatically via a hardware interface from the cache control unit to a state machine, which transfers a whole row of data between the SRAM banks and the DRAM array. This state machine is, for example, the ASM.

Machine learning applications often require many MAC operations. In one embodiment, rather than relying on the RISC-V pipeline for these operations, MAC engine 114 serves as a coprocessor that accelerates the inner product of two arbitrary vectors resident in the PIM SRAM (e.g., SRAM 110) without stalling the RISC-V core. In one example, three operand widths are supported: 4-, 8-, and 16-bit, performing up to four separate two's complement MAC operations per clock cycle, and accumulating to four 12-bit accumulators, two 24-bit accumulators, or a single 48-bit accumulator, respectively. In addition, a set bits counter (e.g., equivalent to the POPCNT instruction in SSE4) supports the acceleration of certain types of binary neural networks.

In one example, given a length and start addresses for each vector, a direct memory access (DMA) engine (not shown) streams vector data from SRAM 110 to the selected arithmetic unit (either MAC engine 114 or the set bits counter). The DMA engine supports locking the multiplier address to perform vector scaling with a constant coefficient. MAC engine 114 detects overflows and interrupts the RISC-V core appropriately.

In one embodiment, data is transferred between DRAM 108 and SRAM 110 using the ASM RAS manager (e.g., state machine 130). In one example, architecturally, the SRAM and compute structures replace DRAM banks 14 and 15, located in bank group 1 at the opposite end of the die from the channel logic and pads. The SRAM row size matches the DRAM row size exactly. The 256-bit GBUS thus connects to the SRAM block in the same position as it would have to DRAM bank 14. The ASM state machine generates signals to control the DRAM bank logic (e.g., 10-bit multiplexed row address, activate, read and write strobes, etc.), as well as address, and read/write strobes for the SRAM banks.

When the ASM is triggered, either by a message written to its mailbox from the RISC-V, or a hardware request from the cache control logic, the ASM begins a transfer by activating the DRAM row that will take part in the data transfer (e.g., DRAM 108 to SRAM 110). Next, in order to re-use as much of the existing GBUS repeater logic as possible, the ASM performs the data transfer in a two-step process (e.g., always a read followed by a write). In the case of data movement from an DRAM row to an SRAM row, the ASM performs a read operation to the source DRAM bank. The column data is preserved on the GBUS after the read is completed. Next, the ASM performs a write operation to the destination SRAM bank and row. This process repeats, for example, four times to transfer an entire DRAM row to SRAM.

In one embodiment, a similar process occurs when transferring data from SRAM to DRAM. This time the SRAM read is performed first, with the data, for example, preserved on the GBUS via keepers. The ASM then performs a write operation to the destination DRAM row. In one example, each row transfer operation is atomic, and the participating DRAM bank is always pre-charged following the transfer.

In one example, a global input/output sense amplifier (GIO SA) (not shown) may serve as a buffer temporarily storing data read from the DRAM (e.g., DRAM 108). The GIO SA may transfer the data read from the DRAM to multiply-accumulation units (MACs) of MAC engine 114.

The MACs may perform an operation using data transmitted from the GIO SA and output a result of the operation.

Hereinafter in this example, the GIO SA and the MACs are referred to as a PIM operator for ease of discussion. The specific circuit structure of the PIM operator in an example in which a semiconductor memory device performs a matrix vector multiplication operation is now discussed. According to an example, a DRAM array may be configured to store 256 bits of data corresponding to at least one row of a matrix, and a GIO SA may receive 256 bits of read data 256-bit RD data from the DRAM array. The DRAM array may include a plurality of DRAM cells, and each of the plurality of DRAM cells may store one bit of data. One or more DRAM cells of the plurality of DRAM cells may collectively represent one piece of data. For example, 16 bits of data may include 16 DRAM cells. The 16 bits of data corresponding to the 16 DRAM cells may correspond to each element of the matrix, and may be transferred to a corresponding MAC and used as an operand. Input vector data, which is another operand for an operation, may be input through a data input/output path Data I/O. The input vector data may be stored in input vector static random access memory (SRAM) and then transferred to each MAC. Each MAC may perform an operation on the matrix data transferred from the DRAM array and the input vector data transferred from the input vector SRAM, and output a result of the operation.

Results of the operation output from each MAC may be summed up through an adder tree (not shown), and output vector data corresponding to a final operation result may be stored in an output vector SRAM. The output vector data stored in the output vector SRAM may be output to the outside through a data input/output path Data I/O, and may be used for the operation again through the input vector SRAM. The PIM operator may include a command generator unit that receives a DRAM command and an address transmitted from a control circuit and then converts the command into more detailed subcommands.

In one example, a memory bank including the PIM operator may be used to perform operations required for neural network implementation, but may also be used to process general memory requests. However, after the data used for the PIM operation is read from one DRAM array, in order to read data used for the processing of the memory request from another DRAM data array, a process of pre-charging the data used for the PIM operation and then activating the data used for the processing of the memory request is required. The time required for reactivation after pre-charging can be long, and thus it may sometimes be desirable to minimize the number of times switching between the PIM operation and the processing of the memory request.

Figure 2:
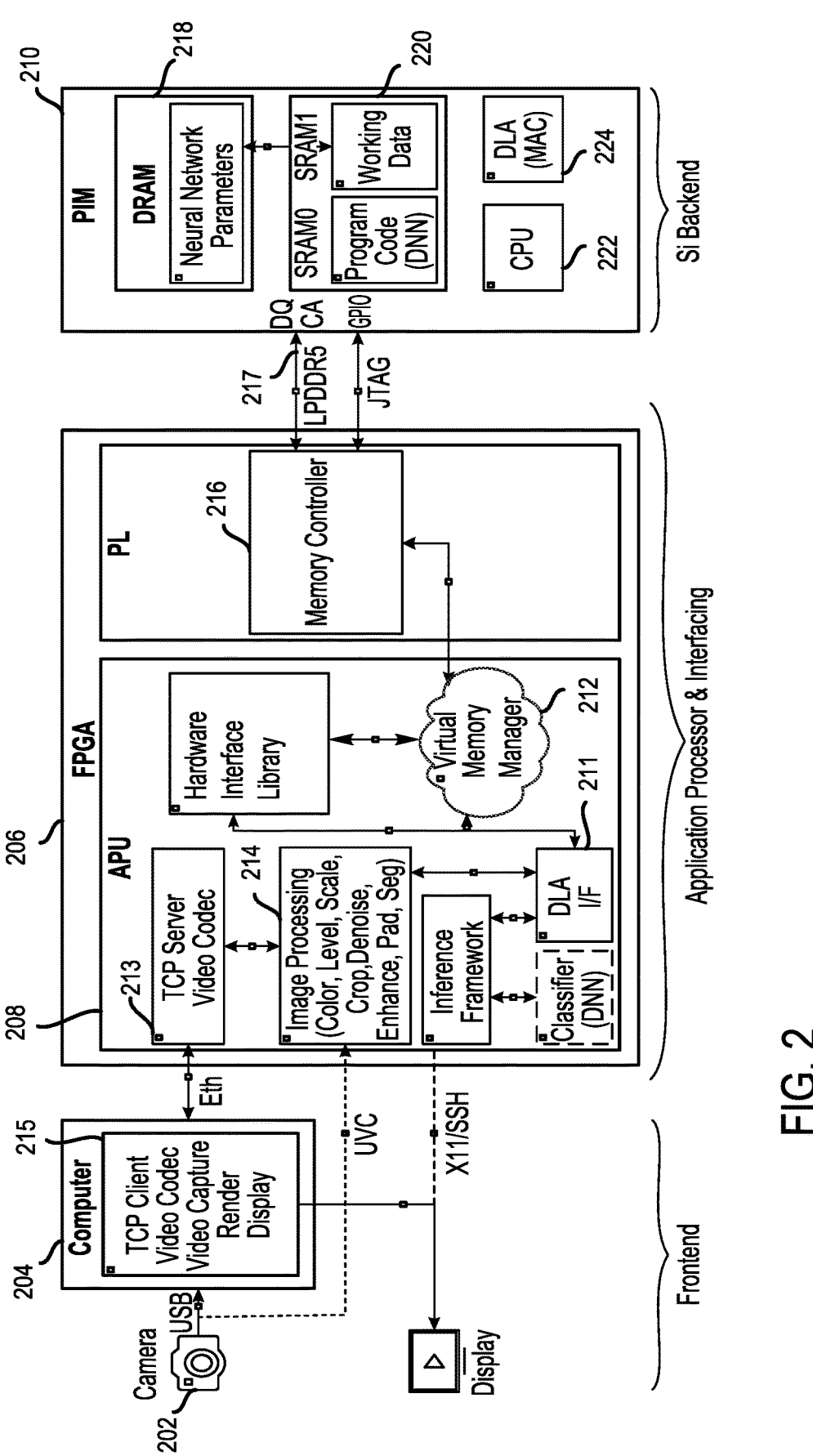
FIG. 2 shows an application processor that receives inference results from an artificial intelligence processing resource of a memory device, in accordance with some embodiments.

FIG. 2 shows an application processor 206 that receives inference results from an artificial intelligence processing resource of memory device 210, in accordance with some embodiments. Application processor 206 (e.g., a field programmable gate array (FPGA) chip) includes a processing device 208 that executes software to implement image processing 214. Application processor 206 also includes memory controller 216 (e.g., implemented in programmable logic). The artificial intelligence processing resource of memory device 210 includes SRAM 220, CPU 222, and deep learning accelerator (DLA) 224.

Application processor 206 is an example of application system 104. Memory device 210 is an example of memory device 106. Camera 202 is an example of camera 102.

Virtual memory manager 212 manages a memory space of processing device 208. Memory manager 212 communicates with memory controller 216 to provide read and write access by processing device 208 to memory device 210. Memory controller 216 communicates with memory device 210 using memory interface 217. In one example, memory interface 217 is a memory bus operating in accordance with a double data rate (e.g., LPDDR5 standard) memory protocol.

In one example, memory manager 212 handles address mapping from deep learning accelerator (DLA) interface 211 to memory controller 216. DLA interface 211 manages sending of image data to memory device 210 and receiving of inference results based on the image data from memory device 210. In one example, DLA interface 211 is software executing on processing device 208.

Camera 202 collects image data. For example, camera 202 collects image data regarding objects in a field of view of camera 202. The image data is sent to computing device 204 (e.g., using a USB interface). Software 215 executes on computing device 204. Software 215 includes a TCP client for communicating with application processor 206 (e.g., using an Ethernet interface).

Computing device 204 sends the image data to processing device 208. Software 213 executes on processing device 208 and includes a TCP server that receives the image data from the TCP client of computing device 204.

In one embodiment, processed image data is initially sent by memory controller 216 to either DRAM 218 or SRAM 220 (e.g., depending on the address sent with an LPDDR write command). The image data is used as an input to a neural network executed by CPU 222 and supported by DLA 224. In one example, DLA 224 is MAC engine 114. In one example, CPU 222 is processing device 112.

The neural network provides an inference result as output. The inference result is sent over memory interface 217 to memory controller 216. Virtual memory manager 212 maps the inference result to an appropriate logical address of processing device 208.

In response to receiving the inference result, processing device 208 can take various actions. In one example, processing device 208 sends the inference result to computing device 204, which presents the inference result on a display for a user. In one example, the inference result is a text and/or an image. In one example, the inference result is used to control a computing system of a vehicle (e.g., braking). In one example, computing device 204 is a controller in a vehicle.

In one example, DRAM 218 stores parameters for a neural network that are loaded into a portion of SRAM 220 for use in performing computations using the neural network (e.g., program code for a deep neural network stored in SRAM0). In one example, a portion of SRAM 220 stores working data (e.g., SRAM1) used by CPU 222 and/or DLA 224 when performing and/or supporting computations for the neural network.

In one example, DRAM 218 has a storage capacity of 4 gigabytes (GB). In one example, SRAM 220 has a storage capacity of 32 kilobytes (kB).

In one example, the memory device 210 is a PIM chip used to implement an end-to-end AI application system. This system consists of three portions: a frontend, an application processor & interfacing, and a backend, as shown in FIG. 2. The frontend portion implements video capture with camera 202 and displays results on a monitor (e.g., the display of FIG. 2). The application processor & interfacing portion is configured on an FPGA. With the application processor on the FPGA, drivers for an IP-based camera, and the displaying of results are implemented on computing device 204.

An image processing pipeline handles image transformations (e.g., color, level, crop, etc.). A simplified LPDDR5 interface and respective software stacks are also implemented in the FPGA to enable communication to the PIM chip.

In one example, deep learning is used for computer vision. Image recognition, object detection, self-driving, and many other AI applications can use the capture of real-world imaging input to obtain inference results. In one example, a standard web camera (e.g., 202) is used to capture static images and videos. The webcam is connected to a normal computer (e.g., 204). The computer also connects an FPGA board with an Ethernet interface, and is responsible for FPGA management and booting.

In one example, to transfer the captured image, an IP protocol is used, and a TCP client is implemented on the computer. The captured image is also compressed before the transfer to improve the image transfer rate. A TCP server and decompression are implemented on the FPGA side.

For result visualization, a standard monitor is connected to the computer, and X11 over SSH is used between the computer and FPGA. In an alternative embodiment, a display can be connected directly to the FPGA by implementing a HDMI controller in the FPGA.

In one example, a Xilinx FPGA evaluation board can be used to implement the required vision processing tasks and interfaces. This board can equip HDMI for video processing applications, RJ-45 Ethernet port for networking, DDR4 and LPDDR4 memory interfaces and high-speed FMC expansion connectors supporting plug-in cards for a DRAM chip and a PIM chip.

In one example, a lightweight operating system is running on the APU (e.g., processing device 208). In addition to the TCP server, an image processing pipeline runs on the OS. This image pipeline consists of color adjustment, level adjustment, image scale, image crop, noise reduction, image enhancement, image padding and image segmentation. Additionally, virtual memory management is implemented and enables software control to the interface.

The FPGA can interface with the PIM chip via two separate ports. The principal interface makes use of the traditional LPDDR5 CA and DQ buses. A state machine implemented in the FPGA fabric plays a sequence of LPDDR5 commands from an internal command buffer to the CA bus. This state machine also clocks data between the DQ bus and internal read and write data buffers.

When special test modes are latched, control of the DQ's inside the PIM chip are relinquished to the compute logic, where the DQ's can be selectively used as a JTAG interface, or as general-purpose input/output (I/O). JTAG signals are generated by software running in the ARM core of the FPGA. The JTAG interface enables the ARM core to directly manipulate SRAM 220 and registers (e.g., registers 126, 128 of FIG. 1) within the compute logic, as well as access an embedded CPU debug port.

In one example, a plug-in card carries the PIM chip as the backend of the application system. An FMC port is used to connect the PIM chip to the FPGA, and power management is implemented for the PIM chip on the plug-in card.

In one example, a multi-layer neural network is coded into the PIM chip and can run a MNIST recognition. In one example, a convolutional neural network is run on the PIM chip for MNIST handwriting recognition In one example, the PIM chip is used for a handwriting digit recognition application. Digits from 0 to 9 are randomly picked and written on a whiteboard in a normal office environment, with use of various sizes, angles, and styles. Image color adjustment, segmentation, resize, cropping, padding and enhancement algorithms are running on the application processor. The segmented image with a single digit is sent to the PIM chip, on which a convolutional neural network (CNN) trained with MNIST dataset can run and return the classification result.

In one example, the CNN can be built with a classic topology including two convolutional layers, two max-pooling layers and two full-connection layers. Mixed integer $8/16$-bit precision can be used by the neural network to achieve good accuracy and small model footprint at the same time.

In an image classification application example, a modern MobileNet V2 trained with an ImageNet dataset is implemented on the PIM chip. MobileNets are a family of deep CNN models designed to minimize parameter size while provide acceptable accuracy through depth-wise separable convolution technique. MobileNets are small, low-latency, low-power and then meet the resource constraints of a variety of use cases, especially in mobile application. They can serve as the backbone model for classification, detection, embeddings, and segmentation.

In one example, a real-life object (e.g., an orange) is positioned in front of camera 202 and classified successfully in a few seconds. In these applications, no off-chip data is fetched during the run time, except the image input.

Figure 3:
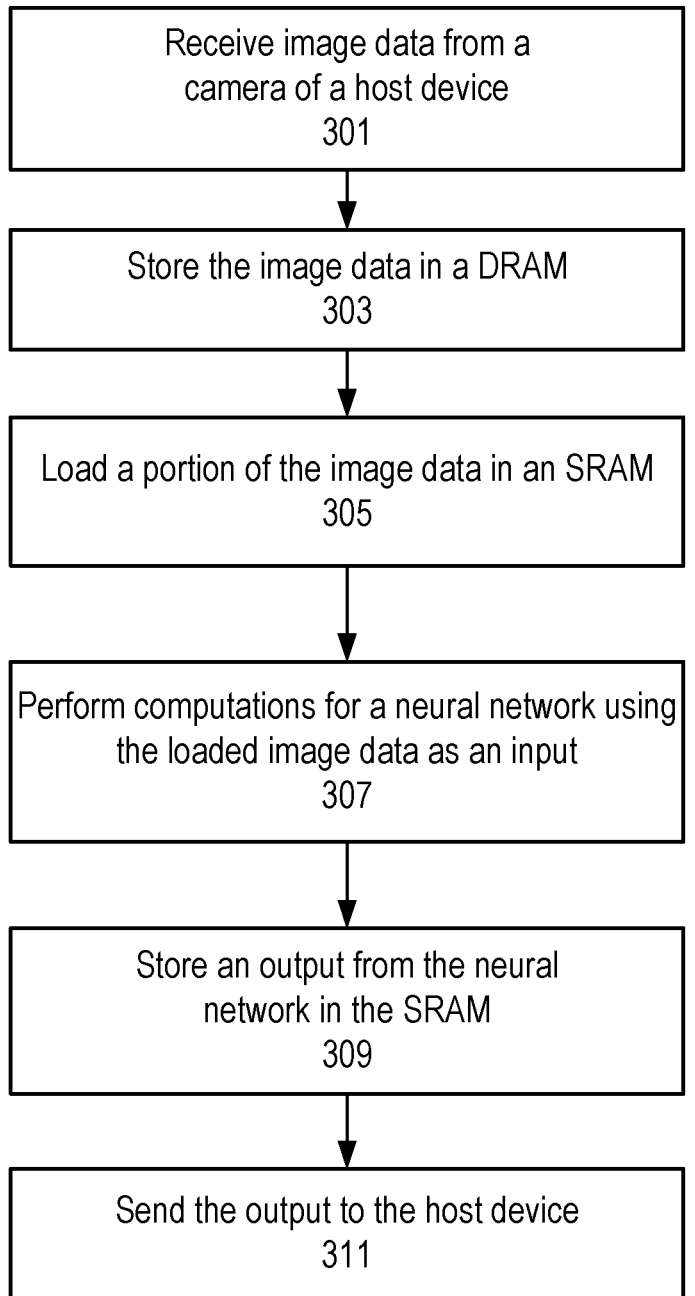
FIG. 3 shows a method for loading image data stored in DRAM of a memory device to SRAM of the memory device for use in computations by a multiply-accumulate (MAC) engine of the memory device, in accordance with some embodiments.

FIG. 3 shows a method for loading image data stored in DRAM of a memory device to SRAM of the memory device for use in computations by a multiply-accumulate (MAC) engine of the memory device, in accordance with some embodiments. For example, the method of FIG. 3 can be implemented in the system of FIG. 1 or 2.

The method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 is performed at least in part by one or more processing devices (e.g., processing device(s) 112, 118 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, image data is received from a camera of a host device. In one example, image data is received from camera 102, 202 when sent by a host (e.g., application system 104).

At block 303, the image data is stored in a DRAM. In one example, the image data received from the camera is sent by memory controller 216 for storage in DRAM 218.

At block 305, a portion of the image data is loaded into an SRAM. In one example, image data received by memory device 210 is provided as an input to a neural network executed on CPU 222. The image data used as the input is loaded into SRAM 220 from DRAM 218.

At block 307, computations are performed for a neural network using the loaded image data as an input. In one example, MAC engine 114 uses data loaded into SRAM 110 from DRAM 108 for performing computations in support of a neural network executed by processing device 112.

At block 309, an output from the neural network is stored in the SRAM. In one example, the output is an inference result stored in SRAM 110.

At block 311, the output is sent to the host device. In one example, processing device 112 sends the inference result over memory bus 105 to application system 104.

In one embodiment, a system comprises: dynamic random access memory (DRAM) (e.g., 108, 218); static random access memory (SRAM) (e.g., 110, 220) to store first data (e.g., neural network parameters and/or image data) loaded from the DRAM; a processing device (e.g., 112, 222) configured to perform, using the first data stored in the SRAM, computations for a neural network; a multiply-accumulate (MAC) engine (e.g., 114, 224) configured to support the computations; and a memory controller (e.g., 116, 206) configured to control read and write access to addresses in a memory space that maps to the DRAM, the SRAM, and at least one of the processing device or the MAC engine.

In one embodiment, the system further comprises a virtual memory manager (e.g., 122, 212), wherein the memory space is visible to the memory manager, the processing device is a first processing device (e.g., 112), and the memory manager manages memory used by a second processing device (e.g., manages a memory space of processing device 118).

In one embodiment, the first and second processing devices are on different semiconductor dies.

In one embodiment, the second processing device is configured to receive image data from a camera (e.g., 102, 202) and provide the image data for use as an input to the neural network.

In one embodiment, the second processing device is further configured to perform image processing of the received image data, and a result from processing the image data is the input to the neural network.

In one embodiment, the image processing (e.g., 120, 214) comprises image segmentation, and the result is a segmented image.

In one embodiment, an output of the neural network is a classification result (e.g., an inference result that identifies a classification of an object), and the classification result identifies an object in the segmented image.

In one embodiment, the system further comprises: registers (e.g., 126, 128) to configure at least one of the processing device or the MAC engine; and a memory interface (e.g., memory bus 105, LPDDR5 interface 217) configured to use a common command and data protocol for reading data from and writing data to the DRAM, the SRAM, and the registers.

In one embodiment, the memory interface is a double data rate (DDR) memory bus (e.g., 105, 217).

In one embodiment, the neural network is a convolutional neural network.

In one embodiment, the system further comprises a plurality of registers (e.g., 126, 128) associated with at least one of the processing device or the MAC engine, wherein the registers are configurable for controlling operation of the processing device or the MAC engine.

In one embodiment, at least one of the registers is configurable in response to a command received by the memory controller from a host device (e.g., a write command or signal received by memory controller 116 from processing device 118).

In one embodiment, a data storage capacity of the DRAM is at least four gigabytes, and a data storage capacity of the SRAM is less than five percent of the data storage capacity of the DRAM.

In one embodiment, the DRAM, the SRAM, the processing device, and the MAC engine are on a same die.

In one embodiment, the system further comprises a command bus (e.g., a command bus and data bus are part of memory bus 105) that couples the memory controller to the DRAM and SRAM, wherein: the memory controller comprises a command buffer and a state machine (e.g., a command buffer and state machine of memory controller 116); and the state machine is configured to provide a sequence of commands from the command buffer to the command bus.

In one embodiment, the MAC engine is further configured as a coprocessor that accelerates an inner product of two vectors resident in the SRAM.

In one embodiment, a row size of the SRAM matches a row size of the DRAM.

In one embodiment, the system further comprises a state machine configured to generate signals to control the DRAM and the SRAM, wherein the signals comprise read and write strobes for banks of the DRAM, and read and write strobes for banks of the SRAM.

In one embodiment, the processing device is further configured to communicate with the DRAM to move data between the DRAM and the SRAM in support of the computations (e.g., move data between DRAM 108 and SRAM 110).

In one embodiment, the SRAM is configurable to operate as a memory for the processing device, or as a cache between the processing device (e.g., 112) and the DRAM (e.g., 108).

In one embodiment, the memory controller accesses the DRAM using a memory bus protocol (e.g., LPDDR), the system further comprising a memory manager (e.g., 122, 212) configured to: manage the memory space as memory for a host device (e.g., 118, 208), wherein the memory space includes a first address corresponding to at least one register of the processing device; receive a signal from the host device to configure the processing device; translate the signal to a first command and first data in accordance with the memory bus protocol, wherein the first data corresponds to a configuration of the processing device; and send the first command, the first address (e.g., an address corresponding to a register 126, 128), and the first data to the memory controller so that the first data is written to the register (e.g., register 126, 128 is updated with the new value to configure the operation of processing device 112, and/or MAC engine 114).

In one embodiment, the system further comprises a memory manager configured to: manage the memory space for a host device; send a command to the memory controller that causes reading of data from a register in the processing device or the MAC engine; and provide, to the host device and based on the read data, a status of the computations.

In one embodiment, the system further comprises a memory manager configured to: receive, from a host device, a signal indicating a new configuration; and in response to receiving the signal, send a command to the memory controller that causes writing of data to a register so that operation of the processing device or the MAC engine is according to the new configuration.

In one embodiment, a system comprises: dynamic random access memory (DRAM); a processing device configured to perform computations for a neural network, wherein the processing device and DRAM are located on a same semiconductor die; a memory controller configured to control read and write access to addresses in a memory space that maps to the DRAM and the processing device; and a memory manager configured to: receive, from a host device, a new configuration for the processing device; translate the new configuration to at least one command, and at least one address in the memory space; and send the command and the address to the memory controller, wherein the memory controller is configured to, in response to receiving the command, update at least one register of the processing device to implement the new configuration.

In one embodiment, the system further comprises a memory interface to receive images from the host device (e.g., bus interface 124 receives image data from memory controller 116), wherein the images are stored in the DRAM and used as inputs to the neural network.

In one embodiment, the memory controller is configured to access the DRAM using a memory bus protocol, and the command and address are compliant with the memory bus protocol.

In one embodiment, a method comprises: receiving image data from a camera of a host device; performing image processing on the image data to provide first data; storing, by a memory controller, the first data in a dynamic random access memory (DRAM); loading at least a portion of the first data to a static random access memory (SRAM) on a same chip as the DRAM; performing, by a processing device on the same chip as the DRAM and SRAM, computations for a neural network, wherein the first data is an input to the neural network, and the SRAM stores an output from the neural network; storing, by copying from the SRAM, the output in the DRAM, wherein the DRAM, the SRAM, and the processing device map to a memory space of the host device, and the memory controller controls read and write access to the memory space; and sending the output to the host device, wherein the host device uses the output to identify an object in the image data.

Various embodiments related to memory devices having memory and processing resources on the same chip (e.g., a single memory die) or in the same package (e.g., multiple die encapsulated in a multi-chip package) are now described below. Some embodiments relate to the management of memory access by multiple clients. The generality of the following description is not limited by the various embodiments described above.

As used below, internal and external clients generally include hardware (e.g., a processing device) that is executing a process that makes requests for access to data in a memory device.

As mentioned above, limited memory bandwidth is a challenge due to frequent data movement back and forth between compute units and memory in deep learning. Also, as mentioned above, bottlenecks of memory bandwidth and power consumption on inter-chip data movement cause significant technical problems when performing computations for a neural network.

In addition, having memory and processing resources in different packages can lead to longer connecting wires. One problem with longer wires is increased impedance. This can cause the power needs of a computing system to increase. Another problem is that external interfaces (e.g., package-to-package) are typically slower than internal interfaces (e.g., a memory bus connecting circuit blocks on a single chip or in an MCP).

To address these and other technical problems, in one embodiment a multi-chip package (MCP) includes an embedded deep learning accelerator (DLA). The MCP includes multiple die. These die include one or more logic die (e.g., with one or more clusters of DLA engine(s)), and one or more memory die (e.g., DRAM and/or NAND flash). The memory die are connected to the logic die via internal interfaces of the MCP. In one example, the internal interface uses the LPDDR5 memory bus protocol (e.g. an x16 interface per channel operating at up to 8533 Mtps). In one example, the internal interface uses general input/output (GIO) pins (e.g. x256 pins per channel operating at up to 533 Mtps).

In one embodiment, the MCP communicates with an external client using an external interface (e.g., LPDDR5). In one example, the external interface permits an external client to communicate with an embedded DLA device of the MCP. The MCP is configured to support a multi-client environment that unifies memory access timing for both internal and external clients. In one example, the internal and/or external clients are various IP blocks (e.g., a direct memory access (DMA) block, a memory manager block, or a JTAG block). In one example, an internal interface of the MCP is passed to an off-package interface via a package substrate. This can be used for integration with external system components (e.g., external clients such as a host system-on-chip (SoC)).

In one embodiment, a memory device includes one or more memories that store data received from a host device. The memory device includes a memory interface (e.g., an LPDDR5 memory bus) to the host device. The memory device further includes one or more processing devices configured to perform, using at least a portion of the data stored in the memory, computations for an artificial intelligence (AI) model. An output of the AI model is stored in one or more of the memories. The memory device has a controller that controls access to the memory by the host device and the processing devices (e.g., to avoid a conflict in memory access). The memory device communicates with the host device over the memory interface using a memory bus protocol (e.g., LPDDR5). This communication includes sending the output of the AI model to the host device.

In one embodiment, a memory device includes one or more processing devices (e.g., DLA engines) configured to accelerate computations for a neural network. The memory device has one or more memory die to store data for the processing device and a host device. The memory device has a memory interface to communicate with the host device.

A controller of the memory device manages time slots during which access to the memory by the host device and/or the processing device(s) is permitted. In one example, the time slots are assigned to the host device and processing devices in a round-robin manner. The controller communicates, by the memory interface using a memory bus protocol, with the host device regarding access to the memory. In one example, the communication provides data to the host device regarding a status of memory access by each of multiple processing devices in a multi-chip package.

Various advantages are provided by at least some embodiments described herein. In one example, an on-package interface (e.g., LPDDR5) can have lower power compared to off-package interface due to shorter wires and less impedance (e.g., not needing on-die termination up to higher speeds than normal). In one example, a mixed memory solution can have single-access memory requests go to byte-addressable storage-like memory (e.g., non-volatile random access memory) and dynamic memory requests go to faster (e.g., scratchpad) memory (e.g., DRAM). In one example, an MCP solution can permit in-package integration to reduce power due to on-die termination for input/output (I/O) and/or be capable of running at higher speeds.

Figure 4:
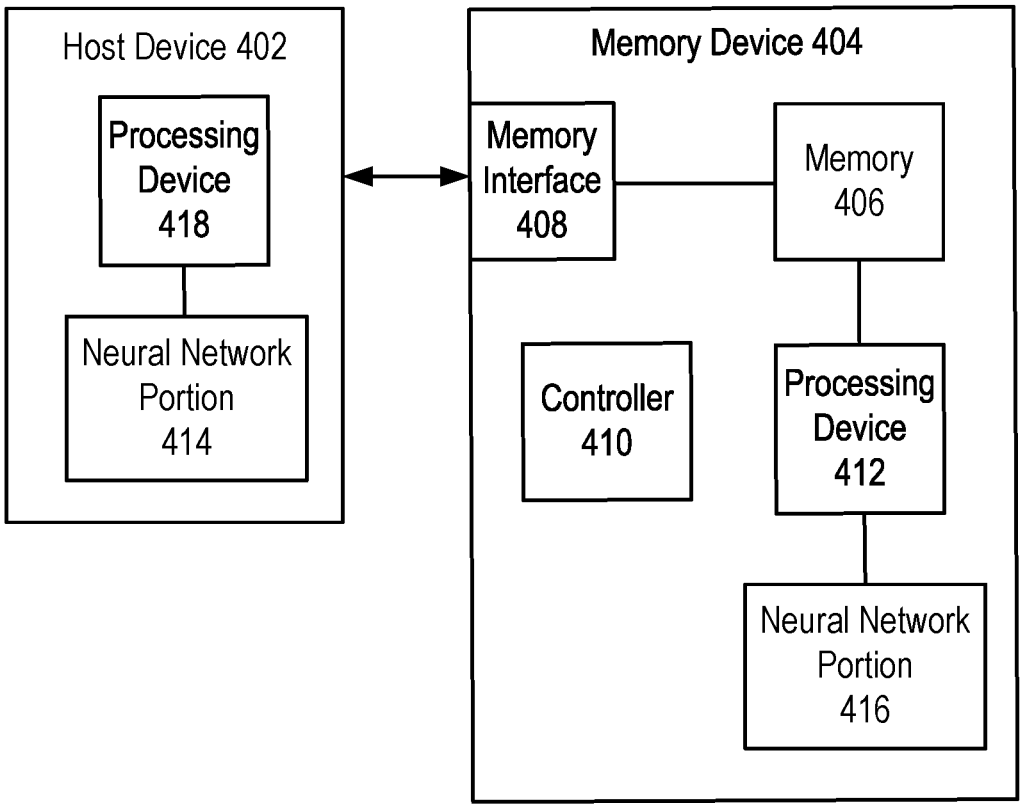
FIG. 4 shows a memory device that manages access to memory by an external host device and an internal processing device(s), in accordance with some embodiments.

FIG. 4 shows a memory device 404 that manages access to memory 406 by an external host device 402 and an internal processing device(s) 412, in accordance with some embodiments. Host device 402 communicates with memory device 404 over memory interface 408. In one example, memory interface 408 operates according to a memory bus protocol. In one example, the memory bus protocol is a double data rate protocol for a dynamic random access memory (DRAM). One example, the protocol is the LPDDR5 bus protocol.

A memory space of host device 402 includes addresses that map to memory device 404. In particular, these addresses map to memory 406 and to processing device 412. In one embodiment, host device 402 accesses all of these addresses for read and/or write operations using the same memory bus protocol (e.g., LPDDR5 protocol is used to store data in DRAM and to control or configure an embedded DLA engine). For example, a bus timing of signals communicated via memory interface 408 to access memory 406 is the same bus timing of signals communicated via memory interface 408 to access addresses associated with processing device 412.

In one embodiment, a portion of the addresses in the memory space of host device 402 corresponds to a configuration of processing device 412. In one example, the addresses map to registers (not shown) of processing device 412. In one example, host device 402 sends write commands to store data in the registers. The stored data configures one or more functions performed by processing device 412. In one example, the configuration relates to a manner in which computations are performed for a neural network model.

In one embodiment, processing device 418 performs computations for a portion 414 of a neural network model that is stored on host device 402. Another portion 416 of the neural network model is stored on memory device 404. In one example, parameters for the neural network portion 416 are stored in memory 406.

Controller 410 manages access to addresses in memory 406 and addresses of processing device 412. This management includes coordinating (e.g., synchronizing timing) of read and write accesses (e.g., AXI bus protocol transactions) by host device 402 and processing device 412.

In one embodiment, processing device 412 is assigned a portion of memory 406 (e.g., assigned dedicated banks of memory in a DRAM). Host device 402 is not able to access this assigned portion without permission being granted by controller 410.

In one embodiment, processing device 418 stores data indicating the addresses of a memory space of host device 402 that correspond to input data for a neural network model and/or output data for the neural network model. For example, host device 402 stores input data in memory 406 at a predetermined address. Processing device 412 reads the input data from the predetermined address to accelerate computations for the neural network model. In one example, host device 402 stores the input data by sending a write command to memory interface 408. The write command includes associated input data to be written in memory 406.

For example, processing device 412 stores output data from the neural network model at a predetermined address. Host device 402 reads the output data from the predetermined address by sending a read command to memory interface 408.

In one embodiment, controller 410 manages timings for memory access to memory 406 and/or processing device 412 based on a timing of signals sent by host device 402 to memory interface 408. In one example, LPDDR5 sync points are used by controller 410 to manage these timings. In one example, memory access timing for processing device 412 and host device 402 are synchronized using these sync points. Host device 402 controls these sync points.

In one embodiment, all internal and external memory transactions are visible to host device 402 via memory interface 408 (e.g., external LPDDR5). For example, memory transactions of internal clients (e.g., processing device(s) 412) are translated by internal memory controller 410 to signaling consistent with the LPDDR5 protocol. From the perspective of the host device 402, this signaling uses the same timing and commands as used by host device 402 for storing data in memory 406 (e.g., DRAM). In this manner, the internal clients are exposed externally to host device 402.

In one embodiment, multiple external clients (e.g., host device 402) can communicate with memory device 404. Also, multiple memory devices 404 can be connected to the same LPDDR5 bus interface to communicate with host device 402.

In one embodiment, memory access is controlled by controller 410 using time-sharing of one or more memory interfaces internal to memory device 404 (e.g., an LPDDR5 internal memory bus, an AXI bus, a general purpose I/O (GIO) interface). For example, an internal LPDDR5 interface (not shown) of memory device 404 is time-shared by all internal clients (e.g., processing devices 412). For example, time-sharing can be managed based on a number of memory transactions by an internal device, or by select pins.

In one embodiment, each external and/or internal client (e.g., host device 402 or processing device 412) is given at most a predetermined number of transactions before another client is given access. In one example, clients are rotated in a round-robin manner. In one example, the time-sharing approach is enumerated at boot time.

In one example, if a client finishes use of an internal memory bus earlier than expected, the client can send a stop command or other signal to controller 410 to indicate this status. In one embodiment, each client can do bus snooping to keep track of a state of an internal bus (e.g., LPDDR5 bus state). In one example, clients connected through an AXI bus internally can be operated using multi-master, multi-slave operation. This permits controller 410 to stall any requests from a client over the AXI bus.

In one example, time-sharing can be done through client select pins.

In one example, controller 410 manages time-sharing for processing device 412 (e.g., an internal DLA device). Controller 410 can send a command to processing device 412 indicating which client is next to use a memory bus or interface in memory device 404. Controller 410 can also send the same type of command or other signaling to host device 402 to indicate a memory access status of internal client devices of memory device 404.

In one embodiment, transaction pipelining can also be used. In one example, transaction pipelining includes multiple reads and writes being in process to different banks (or other locations in memory 406) all at the same time (or at least in process overlapping part of the time).

In one embodiment, memory access timing in memory device 404 is orchestrated across LPDDR5 sync points controlled by the external host device 402 (e.g., a SoC). This gives host device 402 control over timing of access to any part of memory (e.g., memory 406) in memory device 404 as desired. The timing of access used by host device 402 typically creates or determines periods of time in which the host device 402 is not accessing a memory (e.g., not using a particular internal bus). In one example, this creates time slots in which internal clients (e.g., processing devices 412) can access portions of memory that are not currently being accessed by host device 402.

In one embodiment, internal memory accesses in memory device 404 do not occur (e.g., are not permitted by controller 410) until host device 402 creates a sync point or some other form of memory access window. For example, internal clients in memory device 404 cannot start a random memory access. Instead, the internal clients must be assigned a time slot by controller 410, and the time slot is dependent on a timing of host device 402 (e.g., a timing of signaling by host device 402 on an LPDDR5 interface).

In one embodiment, internal clients can access memory in a round-robin manner at time slots in which the external host device 402 is not accessing the memory. The internal controller 410 snoops the bus to maintain awareness of bus usage and status by internal clients and by the host device 402. In one example, controller 410 listens to DDR commands received by the MCP via memory interface 408. Controller 410 examines the commands, decodes the commands, and takes actions based on knowledge of timing ramifications inside memory device 404 due to the commands. For example, rules stored on memory device 404 can define additional actions that are allowed to happen on memory device 404 based on these commands.

Figure 5:
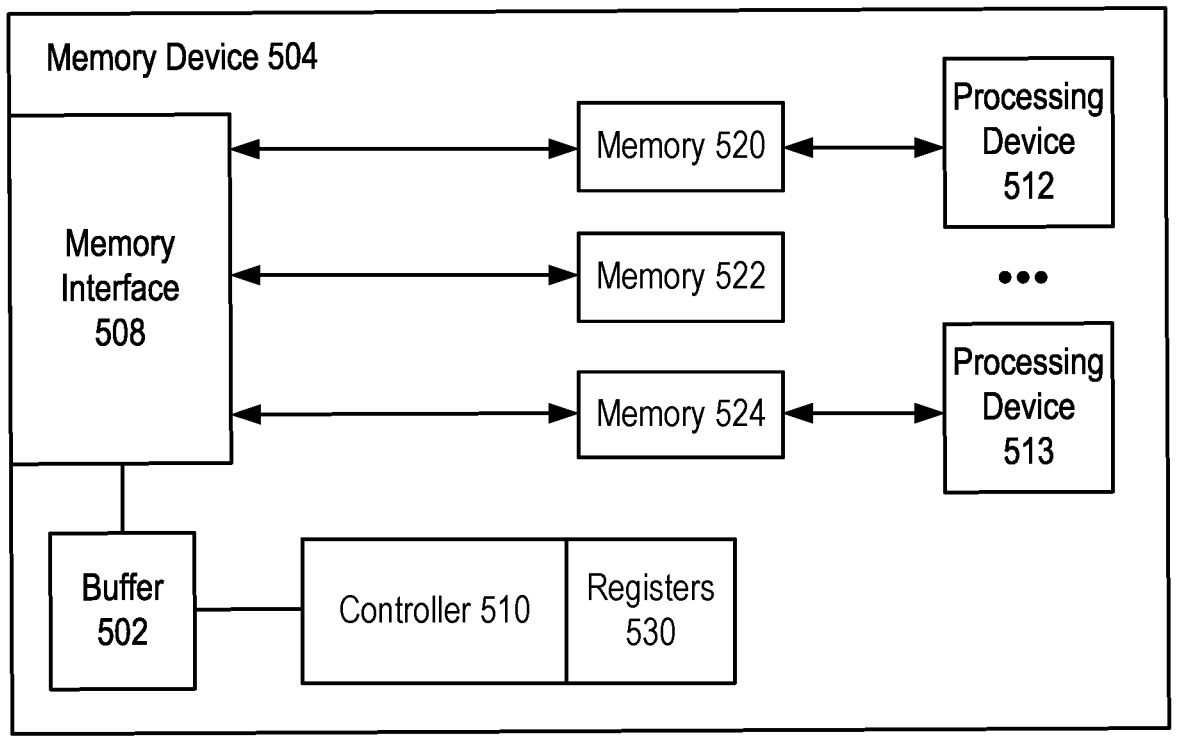
FIG. 5 shows a memory device having a controller that synchronizes memory access by an external host device with memory access by internal processing devices, in accordance with some embodiments.

FIG. 5 shows a memory device 504 having a controller 510 that synchronizes memory access by an external host device (not shown) with memory access by internal processing devices (e.g., 512, 513), in accordance with some embodiments. Memory device 504 is an example of memory device 404. Memories 520, 522, 524 are an example of memory 406. Memory interface 508 is an example of memory interface 408. Controller 510 is an example of controller 410. Processing devices 512, 513 are examples of processing device 412.

In one embodiment, memory 520 is allocated to processing device 512 and memory 524 is allocated to processing device 513. The host device is permitted to access memories 520, 524, but requires permission from controller 510. Controller 510 monitors usage of memories 520, 524, and provides permission to the host device so that there is not a conflict in bus usage.

Data stored in registers 530 determines a configuration of controller 510. In one embodiment, addresses corresponding to registers 530 are in a memory space of the host device. The host writes data to these addresses by sending commands to memory interface 508. For example, the host device writes data corresponding to particular functions that the host device desires to be performed by controller 510. As commands are received by memory interface 508, commands are buffered in buffer 502. In one example, buffer 502 is static random access memory (SRAM). In one example, transactions are received by memory interface 508 and buffered by buffer 502.

In one embodiment, from the perspective of the host device, the memory device 504 is a target memory device that includes data storage functionality (e.g., DRAM and/or NAND flash) with some additional functionality (e.g., AI model computation acceleration). For example, the host device can write data to addresses of memory device 504 that will configure a processing device 512, 513 (e.g., a DLA engine). For example, the host device interacts with all addresses of memory device 504 using timing and signal protocols that are suitable for read and write access to a DRAM using LPDDR5. These interactions can include storage of data in non-volatile memory (e.g., a non-volatile memory 522).

In one embodiment, internal controller 510 buffers all transactions received on memory interface 508 (e.g., an external LPDDR5 interface) in SRAM buffer space of buffer 502 (e.g., thus preserving the deterministic nature of the LPDDR5 memory bus protocol). The buffered transactions (and associated data) are, for example, sent to internal general input/output (GIO) buses. Buffer 502 also buffers data received from the GIO buses. The buffered transactions can include write commands to store data in volatile and/or non-volatile memory.

In one embodiment, controller 510 can stall memory access activity by any one or more internal clients of memory device 504 (e.g., processing device 512, 513). In one example, internal memory controller 510 may stall transactions from internal clients depending on the buffer size and utilization by the internal clients of internal buses (e.g., buses connecting memories 520, 522, 524 to memory interface 508). In one example, the transactions are stalled by controller 510 according to the AXI memory bus protocol. In one example, transactions are stalled to keep transactions received by memory interface 508 (e.g., LPDDR5 transactions from the host device) as a higher priority over internal transactions or other internal activity.

In one embodiment, memory protocol timings of memory interface 508 are tuned to handle worst case conflicts that are possible due to traffic from internal buses of memory device 504. For example, this can preserve the deterministic nature of an LPDDR5 bus. For example, if there is a conflict on an internal bus, the memory timings of the LPDDR5 bus are managed so that controller 510 can resolve the conflict. For example, controller 510 can resolve a conflict and return data via an AXI bus to a client that first requested the data. For example, controller 510 can resolve a conflict and return data via an LPDDR5 bus to a client that requested the data while an AXI bus transaction is in progress. In one example, the time to resolve this conflict is equal to or corresponds to a single burst timing (e.g., a data burst of eight data bits).

In one embodiment, buffer 502 accepts all read and write commands and data to and from the host device. Buffer 502 then re-broadcasts commands and data (corresponding to an incoming command and/or data queue of buffer 502) as needed to and from memories 520, 522, 524. Use of buffer 502 permits preserving external timing according to DDR standard protocols from the perspective of the host device. In one example, the host device views all addresses of memory device 504 as corresponding to storage in DRAM using a double data rate memory bus interface 508.

Figure 6:
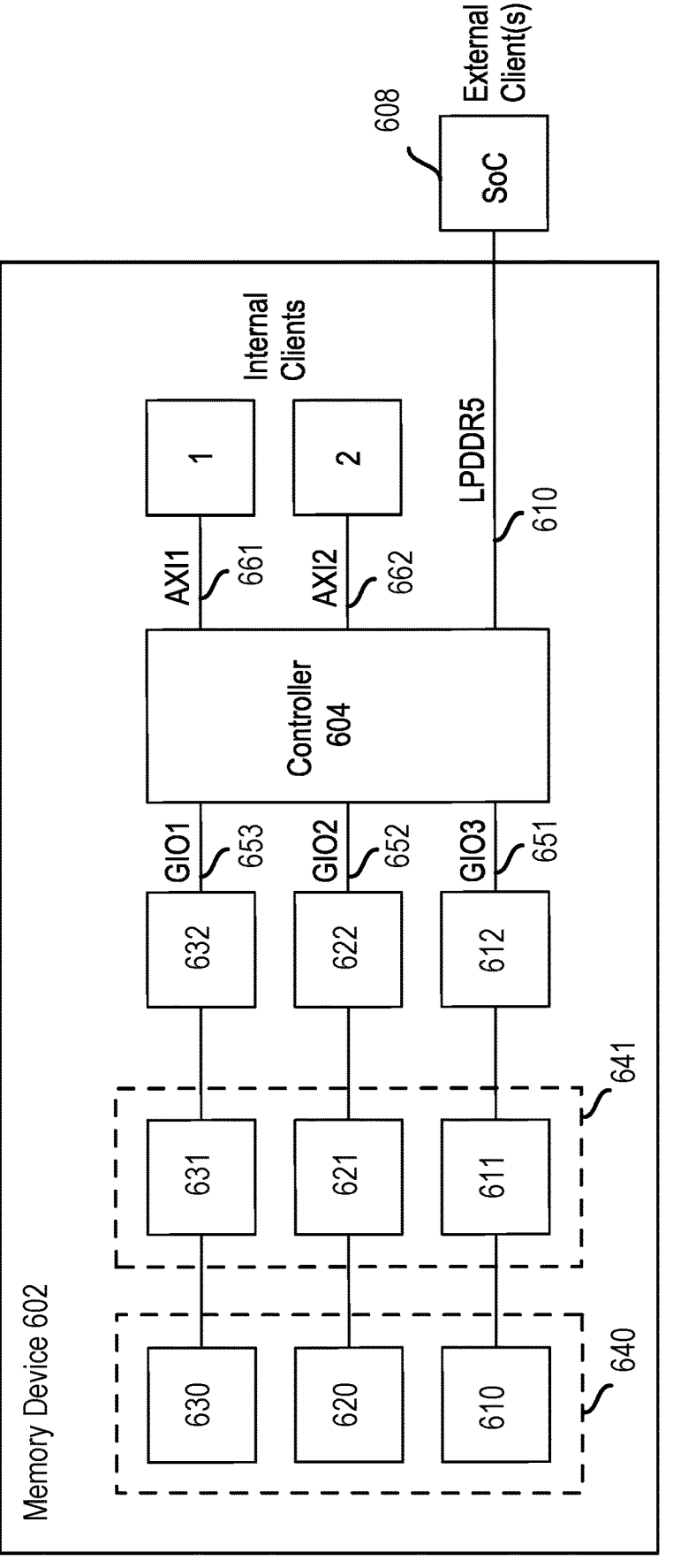
FIG. 6 shows a memory device having banks of memory, in accordance with some embodiments. Access to the banks by internal and external clients is managed by a controller.

FIG. 6 shows a memory device 602 having various banks of memory, in accordance with some embodiments. For example, banks 610, 611, 612 are banks in a first memory die (not shown). Banks 620, 621, 622 are banks in a second memory die (not shown). Banks 630, 631, 632 are banks in a third memory die (not shown). In one example, the memory die are all of the same type. In one example, the memory die are of different types (e.g., different types of memory cells or memory cell materials). For example, the first memory die can be DRAM, and the second memory die can be NAND flash memory.

Memory device 602 is an example of memory device 404, 504. In one example, banks 630, 631, 632 are located in memory 520. In one example, banks 610, 611, 612 are located in memory 524.

Access to the banks by internal and external clients is managed by a controller 604. Controller 604 is an example of controller 410, 510. Various internal buses 651, 652, 653 (e.g., GIO1, GIO2, GIO3) are used to access the various banks. For example, bus 651 is used for read and write access to banks 610, 611, 612.

Controller 604 can control access to the various banks organized by (located in) bank groups 640, 641. For example, bank group 640 includes banks 610, 620, 630.

Internal clients 1, 2 communicate with controller 604 using buses 661, 662. In one example, buses 661, 662 (e.g., AXI1, AXI2) communicate according to the AXI bus protocol. Internal clients 1, 2 are examples of processing device 412, 512, 513.

Controller 604 communicates with external client(s) 608 over bus 610. In one example, external client 608 is a system-on-chip (e.g., SoC). External client 608 is an example of host device 402 of FIG. 4.

In one example, bus 610 is an LPDDR5 memory bus. In one example, bus 610 permits communication between host device 402 and memory device 404. In one example, bus 610 is connected to memory interface 508.

In one example, bank group 640 is allocated for access by internal client 1. In one example, bank group 641 is allocated for access by external client 608 or internal client 2. Controller 604 uses time-sharing to permit the foregoing access without a timing conflict. The time-sharing is managed to be synchronized with timing of communications (e.g., LPDDR5 signaling) on memory bus 610.

In one embodiment, channel allocation is used. Each internal and external client (e.g., external SoC 608) is allocated a separate internal GIO bus (e.g., data on GIO1 bus goes to internal client 1 via AXI1 bus, data on GIO2 bus goes to internal client 2 via AXI2 bus, data on GIO3 bus goes to external client 608 via LPDDR5 bus). External client 608 can access its allocated internal bus through the LPDDR5 bus (e.g., controller 604 translates and/or bypasses data from the LPDDR5 bus to the GIO3 bus).

In one embodiment, external client 608 also can access other internal buses (e.g., bus 652 and/or 653), which are allocated to other clients (e.g., IP blocks), by sending a memory request to controller 604. Access to these other buses by external client 608 is only by permission from controller 604. For example, the permission is granted or denied by internal memory controller 604 and communicated back to external client 608 (e.g., via a dedicated ACK pin, or by fulfilling the request and sending fake data, which can be determined by a valid pin). In one example, sending fake data is a way to tell the host device whether permission or memory access by the host device is granted or not.

External client 608 can also communicate with internal memory controller 604 via LPDDR5 bus 610 by writing/reading some predetermined address space, which is mapped to configuration registers (e.g., 530) of controller 604. Internal clients are also able to similar write/read a predetermined address space, which is mapped to the configuration registers of controller 604. In one example, internal client 1 writes data to a predetermined address space that causes configuration of controller 604. In one example, this is an updated configuration suitable for processing a type of input data and/or a type of neural network being executed using the input data.

In one embodiment, bank groups and virtual channels are used. Each internal and/or external client is assigned a bank group (e.g., bank group 640, 641). In one example, the bank group is spread out evenly on some or all internal GIO buses. Each bank group is assigned a virtual channel, which time-shares the GIO buses. In one example, the buses are time-shared based on a predetermined number of clock cycles or time slots (e.g., a round-robin sharing is used).

In one embodiment, a timing of the bus 610 (e.g., external LPDDR5 speed) is tuned to this time-sharing speed. In other words, internal bus timing is synchronized with external bus 610 timing.

In one embodiment, external client 608 can access bank groups other than the bank group to which it is assigned. In one example, access to these other bank groups is done via group select pins, but only by permission. In one example, external client 608 makes a request to controller 604 for access to other bank groups. The access is permitted only if permission is granted by controller 604.

In one embodiment, the host device (e.g., external client 608) only has open access (without requiring permission of controller 604) to the memory allocated to the host device (e.g., memory behind GIO3 bus). For example, this is the memory space that the host device can talk to and not interfere with the other memory in memory device 602.

The host device can also access the memory spaces behind the GIO1, GIO2 buses, but has to ask permission of controller 604 to do so. For example, the host device can direct data into the memory space behind the GIO1 bus so that the data could be used by a DLA engine (e.g., internal client 1). After directing the data to the memory space, the host device can tell the DLA engine to start processing. Then, the DLA engine can run its own process on its own independent timing (e.g., independent of the host device) to perform an artificial intelligence event on the memory accessible by the GIO1 bus. At the same time, the host device can access the memory accessible on the GIO3 bus.

For example, the host device can put weights for a neural network into the memory space of the GIO1 bus. Also, the host device can load an image in the memory space and request that the DLA engine use the image as an input to provide an output result.

In one example, the host device can directly access controller 604 to configure controller 604 by reading and writing to a dedicated memory address space. For example, the data is written to registers (e.g., registers 530 in the dedicated memory address space) in controller 604 that control certain functions of controller 604.

In one embodiment, each bank group is assigned a virtual channel. This creates time slots of valid data communicated either as input or output. Controller 604 manages these time slots. In one example, the external LPDDR bus 610 speed and tuning is used as a basis for managing internal time slots to provide memory access to internal and external clients of memory device 602.

Figure 7:
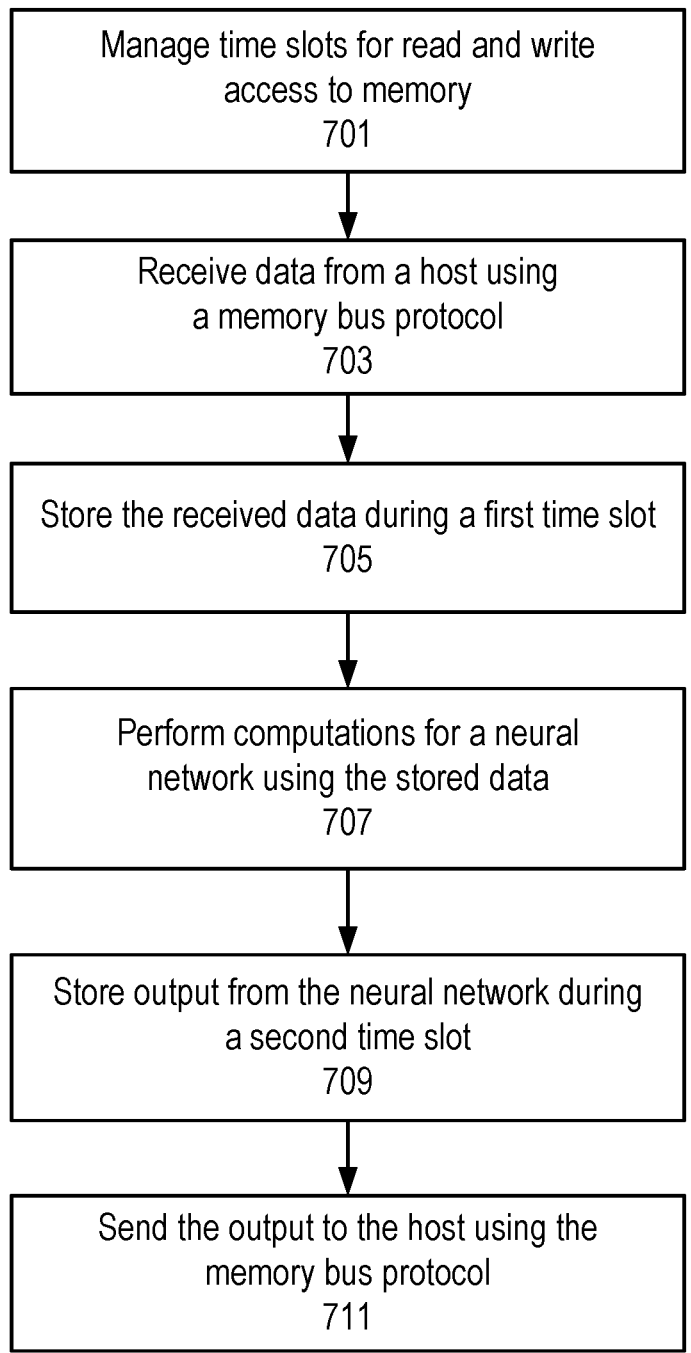
FIG. 7 shows a method for managing time slots for read and write access to memory, in accordance with some embodiments.

FIG. 7 shows a method for managing time slots for read and write access to memory, in accordance with some embodiments. For example, the method of FIG. 7 can be implemented in the system of FIGS. 4-6.

The method of FIG. 7 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 7 is performed at least in part by one or more processing devices (e.g., controller 410, processing device 418, controller 510, controller 604).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 701, time slots for read and write access to memory are managed. In one example, controller 410 manages time slots to provide read and write access by host device 402 and processing device 412. This avoids a timing conflict when accessing data in memory 406, which is used to store data by host device 402 and processing device 412.

At block 703, data is received from a host using a memory bus protocol. In one example, memory interface 508 receives data from a host device. The data is to be stored in memory 522, which is allocated to the host device.

At block 705, the received data is stored during a first time slot. In one example, controller 604 receives data (to be written to memory) on bus 610 from external client 608. Controller 604 determines a first time slot in which external client 608 can access bank group 640 or 641 so that the received data can be stored.

At block 707, computations for a neural network are performed using the stored data. In one example, processing device 412 uses input data loaded into memory 406 by host device 402. The input data is provided as input to neural network portion 416. An output result from neural network portion 416 is stored in memory 406 at a predetermined address known by host device 402. Host device 402 reads memory 406 at the predetermined address to obtain the output result.

In one example, the output result above is provided by processing device 418 as input to neural network portion 414. In one example, an output result from neural network portion 414 that is based on the foregoing input is used to control a function or system of a vehicle in which host device 402 is mounted.

At block 709, output from the neural network is stored during a second time slot. In one example, controller 510 determines a second time slot that will not conflict with the first time slot. Based on this determination, controller 510 assigns the second time slot to processing device 513 for accessing memory 524.

At block 711, the output from the neural network is sent to the host using the memory bus protocol. In one example, an output result from neural network computations performed by internal client 1 is sent to external client 608 on bus 610.

In one embodiment, an apparatus (e.g., memory device 404) comprises: at least one memory (e.g., memory 406) configured to store data received from a host device (e.g., 402); a memory interface (e.g., 408) to the host device; at least one processing device (e.g., 412, a DLA engine) configured to perform, using the data stored in the memory, computations for an artificial intelligence (AI) model (e.g., neural network portion 416) to provide at least one result; and a controller (e.g., 410) configured to: control access to the memory; and communicate, by the memory interface using a memory bus protocol (e.g., LPDDR5), with the host device, the communication including sending the result to the host device.

In one embodiment, the memory includes at least one of volatile memory (e.g., DRAM) or non-volatile memory (e.g., NAND flash).

In one embodiment, the AI model is a neural network.

In one embodiment, the data stored in the memory is at least one of input data for the AI model, or parameters (e.g., weights) for the AI model.

In one embodiment, the memory interface is configured to receive a command and associated data from the host device, and the controller is further configured to, in response to receiving the command, write the associated data to the memory.

In one embodiment, at least a portion of the AI model (e.g., neural network portion 414) resides on the host device, and the host device performs computations for the AI model based on the result.

In one embodiment, the memory, processing device, and controller are in a multi-chip package (MCP).

In one embodiment, the processing device includes a deep learning accelerator (DLA) configured to perform the computations for the AI model.

In one embodiment, the apparatus further comprises a first bus (e.g., 651) and a second bus (e.g., 653), wherein the memory comprises first memory (e.g., banks 610, 611, 612) and second memory (e.g., banks 630, 631, 632), the first bus provides access to the first memory, and the second bus provides access to the second memory.

In one embodiment, the first bus is allocated to the host device, the second bus is allocated to the processing device, and the controller is further configured to: receive, by the memory interface from the host device, a request for permission to access the second bus; in response to receiving the request, make a decision to grant or deny the permission; and signal, by the memory interface to the host device, an indication of the decision.

In one embodiment, the processing device is further configured to write the result to the second memory, and the controller is further configured to: receive a request from the host device for the result; in response to receiving the request, read the result from the second memory; and send the read result to the host device.

In one embodiment, a memory space (e.g., a memory space of processing device 418 managed by a virtual memory manager) of the host device includes addresses in the first memory and the second memory, and the result is stored at an address of the memory space in the second memory.

In one embodiment, the controller is further configured to: receive, by the memory interface from the host device, a command to write first data associated with a configuration for the processing device; and in response to receiving the command, write the first data to the second memory; wherein the processing device is further configured to read the first data from the second memory to implement the configuration.

In one embodiment, a type (e.g., a type of memory technology) of the first memory is different from a type (e.g., a performance characteristic, for example as determined by controller 410, 510 based on data collected during operation of a memory device) of the second memory.

In one embodiment, the memory comprises dynamic random access memory (DRAM), and the memory bus protocol is a double data rate (DDR) protocol (e.g., LPDDR5).

In one embodiment, controlling access to the memory comprises controlling access by the host device and the processing device.

In one embodiment, the memory bus protocol operates according to a first timing (e.g., a timing for an LPDDR5 interface to host device 402), and the controller is further configured to control access to the memory by the processing device (e.g. by internal client 1 using internal AXI bus 661) according to a second timing that is independent of the first timing.

In one embodiment, the memory comprises a first memory and a second memory that each map into a memory space of the host device; and the second memory, but not the first memory, maps into a memory space of the processing device. The controller is further configured to: receive a first signal from the host device; in response to receiving the first signal, write first data to the second memory; receive a second signal from the host device; and in response to receiving the second signal, cause the processing device to start processing to perform the computations for the AI model. The processing device reads the first data from the second memory for performing the computations.

In one embodiment, the second signal is received after the first signal.

In one embodiment, a timing by the processing device of the processing to perform the computations is independent of a timing of access to the first memory by the host device.

In one embodiment, the controller is further configured to write data to the first memory for the host device while the processing device is performing the computations.

In one embodiment, the controller further comprises at least one register (e.g., registers 530) at a first address in a memory space of the host device, and the controller is further configured to: receive a command from the host device to write first data at the first address; and in response to receiving the command, store the first data in the register. At least one function of the controller is determined based on the stored first data.

In one embodiment, the apparatus further comprises a first bus and a second bus. The memory comprises first memory having first banks, and second memory having second banks; the first bus provides access to the first memory; the second bus provides access to the second memory; a first bank group (e.g., bank group 641) is associated with the host device, the first bank group including at least one of the first banks and at least one of the second banks; and a second bank group (e.g., bank group 640) is associated with the processing device, the second bank group including at least one of the first banks and at least one of the second banks. The controller is further configured to manage time-sharing of the first and second buses so that the host device and the processing device have access to the first and second bank groups, respectively, at different time slots.

In one embodiment, a duration of each time slot is determined based on a number of clock cycles.

In one embodiment, a timing for the communication via the memory interface with the host device is synchronized with a timing of the time-sharing.

In one embodiment, an apparatus comprises: at least one processing device (e.g., internal clients 1, 2) configured to accelerate computations for a neural network; at least one memory configured to store data for the processing device and a host device; a memory interface to the host device; and a controller configured to: manage time slots during which access to the memory by at least one of the host device or the processing device is permitted; and communicate, by the memory interface using a memory bus protocol, with the host device regarding access to the memory.

In one embodiment, the controller is further configured to: monitor memory transactions by the processing device, each transaction associated with an access to the memory; translate the transactions to provide signals that conform to the memory bus protocol; and send, by the memory interface, the signals to the host device.

In one embodiment, the controller is further configured to signal the processing device regarding availability of a time slot to access the memory.

In one embodiment, access to the memory by the processing device is limited to a threshold number of memory transactions.

In one embodiment, the controller is further configured to synchronize a timing of the time slots with a timing of signaling on the memory interface.

In one embodiment, the signaling comprises signals communicated according to a double data rate (DDR) memory bus protocol.

In one embodiment, the controller is further configured to: monitor memory transactions by the processing device and the host device; and based on monitoring the memory transactions, provide access to a first portion of the memory by the host device during a first time slot, and access to a second portion of the memory by the processing device during at least a portion of the first time slot.

In one embodiment, the apparatus further comprises: a buffer (e.g., 502) configured to buffer transactions and associated data received by the memory interface from the host device; and internal buses used for read and write access to portions of the memory; wherein the controller is further configured to send the transactions and associated data from the buffer to the internal buses.

In one embodiment, the controller is further configured to stall transactions received from the processing device to avoid a conflict with a transaction received by the memory interface from the host device.

In one embodiment, a method comprises: providing time slots for read and write access to memory; receiving, using a memory bus protocol, data from a host device; storing the received data during a first time slot of the time slots; performing, using the stored data, computations for an artificial intelligence (AI) model to provide at least one result; storing the result in the memory during a second time slot of the time slots; and sending, using the memory bus protocol, the result to the host device.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:
dynamic random access memory (DRAM) configured to store data received from a host device; and
at least one processing device configured to:
perform, using first data loaded into static random access memory (SRAM) from the DRAM, computations for an artificial intelligence (AI) model to provide at least one result; and
send the result to the host device.

2. The apparatus of claim 1, wherein the AI model is a neural network.

3. The apparatus of claim 1, wherein the data stored in the DRAM is at least one of input data for the AI model, or parameters for the AI model.

4. The apparatus of claim 1, wherein a memory interface is configured to receive a command and associated data from the host device, and the processing device is further configured to, in response to receiving the command, write the associated data to the DRAM.

5. The apparatus of claim 1, wherein at least a portion of the AI model resides on the host device, and the host device performs computations for the AI model based on the result.

6. The apparatus of claim 1, wherein the DRAM and the processing device are in a multi-chip package (MCP).

7. The apparatus of claim 1, wherein the processing device includes a deep learning accelerator (DLA) configured to perform the computations for the AI model.

8. The apparatus of claim 1, further comprising a first bus and a second bus, wherein the DRAM comprises first memory and second memory, the first bus provides access to the first memory, and the second bus provides access to the second memory.

9. The apparatus of claim 8, wherein the first bus is allocated to the host device, the second bus is allocated to the processing device, and the processing device is further configured to:
receive, by a memory interface from the host device, a request for permission to access the second bus;
in response to receiving the request, make a decision to grant or deny the permission; and signal, by the memory interface to the host device, an indication of the decision.

10. The apparatus of claim 8, wherein the processing device is further configured to:
write the result to the second memory;
receive a request from the host device for the result;
in response to receiving the request, read the result from the second memory; and
send the read result to the host device.

11. The apparatus of claim 8, wherein a memory space of the host device includes addresses in the first memory and the second memory, and the result is stored at an address of the memory space in the second memory.

12. The apparatus of claim 8, wherein the processing device is further configured to:
receive, by a memory interface from the host device, a command to write first data associated with a configuration for the processing device; and
in response to receiving the command, write the first data to the second memory;
wherein the processing device is further configured to read the first data from the second memory to implement the configuration.

13. The apparatus of claim 1, wherein the host device accesses data in the DRAM and SRAM using a same memory bus protocol.

14. The apparatus of claim 1, wherein the host device accesses data in the DRAM using a memory bus protocol that operates according to a first timing, and the processing device is further configured to control access to the DRAM according to a second timing that is independent of the first timing.

15. The apparatus of claim 1, wherein:
the DRAM comprises a first memory and a second memory that each map into a memory space of the host device;
the second memory, but not the first memory, maps into a memory space of the processing device; and
the processing device is further configured to:
receive a first signal from the host device;
in response to receiving the first signal, write first data to the second memory;
receive a second signal from the host device; and
in response to receiving the second signal, cause the processing device to start processing to perform the computations for the AI model, wherein the processing device reads the first data from the second memory for performing the computations.

16. The apparatus of claim 15, wherein the second signal is received after the first signal.

17. The apparatus of claim 15, wherein a timing by the processing device of the processing to perform the computations is independent of a timing of access to the first memory by the host device.

18. The apparatus of claim 15, further comprising a controller is configured to write data to the first memory for the host device while the processing device is performing the computations.

19. The apparatus of claim 1, further comprising a controller comprising at least one register at a first address in a memory space of the host device,
wherein the controller is configured to:
receive a command from the host device to write first data at the first address; and
in response to receiving the command, store the first data in the register;

wherein at least one function of the controller is determined based on the stored first data.

20. The apparatus of claim 1, further comprising a controller, a first bus, and a second bus, wherein:

the DRAM comprises first memory having first banks, and second memory having second banks;

the first bus provides access to the first memory;

the second bus provides access to the second memory;

a first bank group is associated with the host device, the first bank group including at least one of the first banks and at least one of the second banks;

a second bank group is associated with the processing device, the second bank group including at least one of the first banks and at least one of the second banks; and the controller is configured to manage time-sharing of the first and second buses so that the host device and the processing device have access to the first and second bank groups, respectively, at different time slots.

21. The apparatus of claim 20, wherein a duration of each time slot is determined based on a number of clock cycles.

22. The apparatus of claim 20, wherein a timing for communication by the controller with the host device is synchronized with a timing of the time-sharing.

23. An apparatus comprising:

at least one processing device configured to accelerate computations for a neural network;

at least one memory configured to store data for the processing device and a host device;

a memory interface to the host device; and a controller configured to:

manage time slots during which access to the memory by at least one of the host device or the processing device is permitted;

communicate, by the memory interface using a memory bus protocol, with the host device regarding access to the memory; and monitor memory transactions by the processing device and the host device; and based on monitoring the memory transactions, provide access to a first portion of the memory by the host device during a first time slot, and access to a second portion of the memory by the processing device during at least a portion of the first time slot.

24. The apparatus of claim 23, wherein the controller is further configured to:

monitor memory transactions by the processing device, each transaction associated with an access to the memory;

translate the transactions to provide signals that conform to the memory bus protocol; and send, by the memory interface, the signals to the host device.

25. The apparatus of claim 23, wherein the controller is further configured to signal the processing device regarding availability of a time slot to access the memory.

26. The apparatus of claim 23, wherein access to the memory by the processing device is limited to a threshold number of memory transactions.

27. The apparatus of claim 23, wherein the controller is further configured to synchronize a timing of the time slots with a timing of signaling on the memory interface.

28. The apparatus of claim 27, wherein the signaling comprises signals communicated according to a double data rate (DDR) memory bus protocol.

29. The apparatus of claim 26, further comprising:

a buffer configured to buffer transactions and associated data received by the memory interface from the host device; and internal buses used for read and write access to portions of the memory;

wherein the controller is further configured to send the transactions and associated data from the buffer to the internal buses.

30. The apparatus of claim 29, wherein the controller is further configured to stall transactions received from the processing device to avoid a conflict with a transaction received by the memory interface from the host device.

31. A method comprising:

providing time slots for read and write access to memory;

signaling a processing device regarding availability of a time slot to access memory;

synchronizing a timing of the time slots with a timing of the signaling;

receiving, using a memory bus protocol, data from a host device;

storing the received data during a first time slot of the time slots;

performing, using the stored data, computations for an artificial intelligence (AI) model to provide at least one result;

storing the result in the memory during a second time slot of the time slots; and sending, using the memory bus protocol, the result to the host device.

32. The apparatus of claim 1, wherein the DRAM is configured to store parameters for a neural network, and images received from the host device are used as input to the neural network.

33. The apparatus of claim 32, further comprising a multiply-accumulate (MAC) engine configured to receive the first data for executing the neural network.

* * * * *